July 2, 1946.  J. M. HAIT ET AL  2,403,362
RUNNING GEAR
Filed July 5, 1943  4 Sheets-Sheet 3
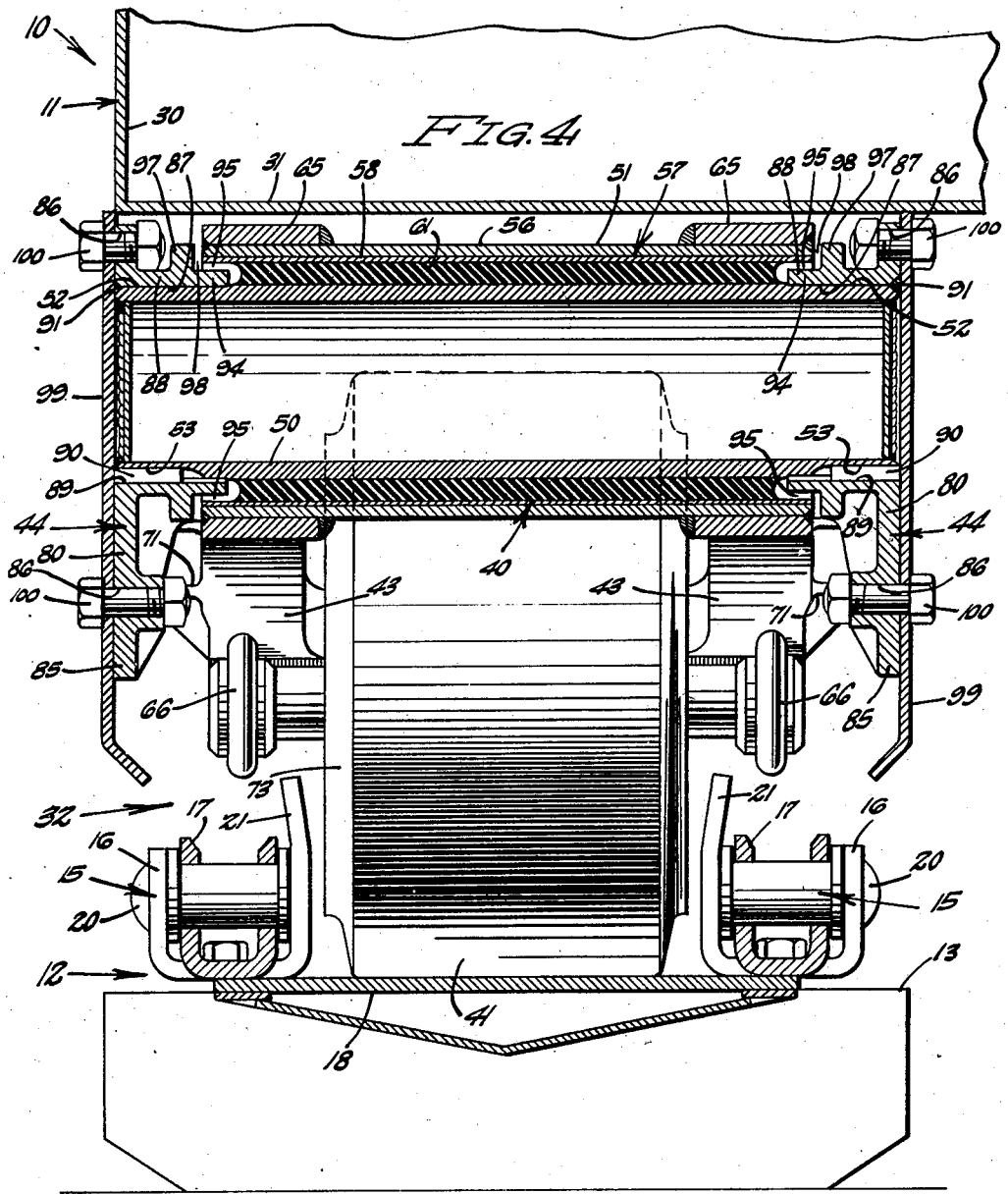
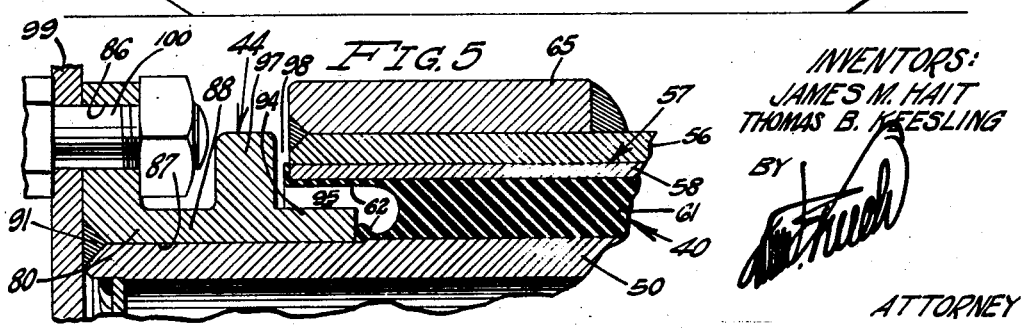
INVENTORS:
JAMES M. HAIT
THOMAS B. KEESLING
BY
ATTORNEY

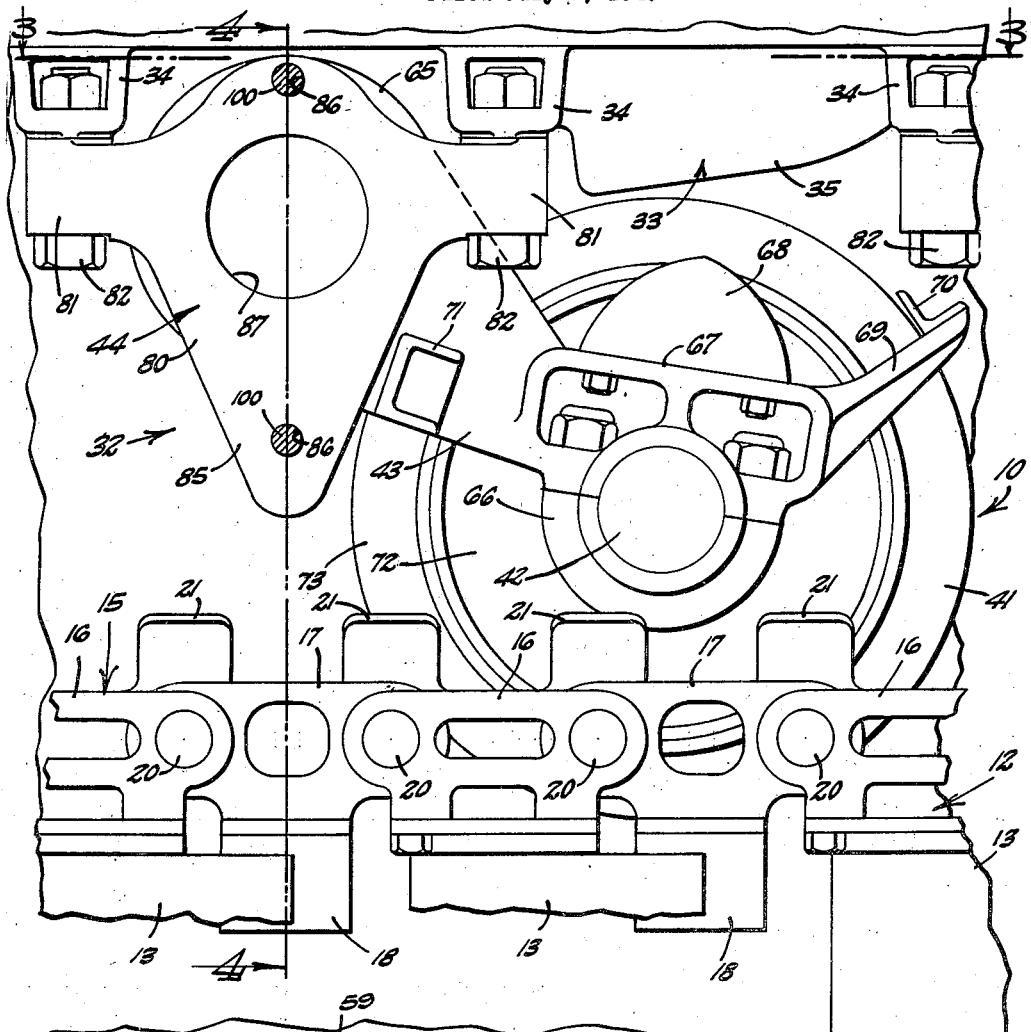
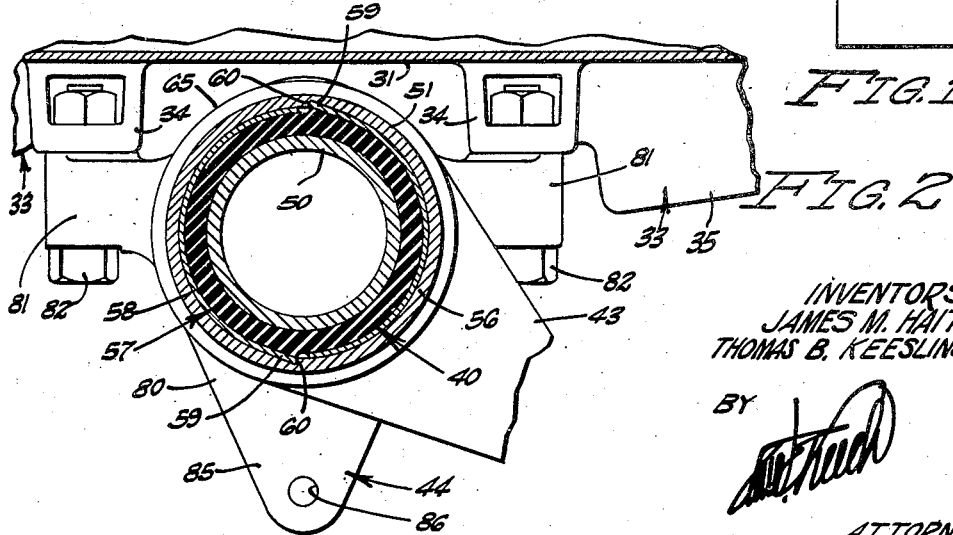
FIG.1
FIG.2
INVENTORS:
JAMES M. HAIT
THOMAS B. KEESLING
BY
ATTORNEY

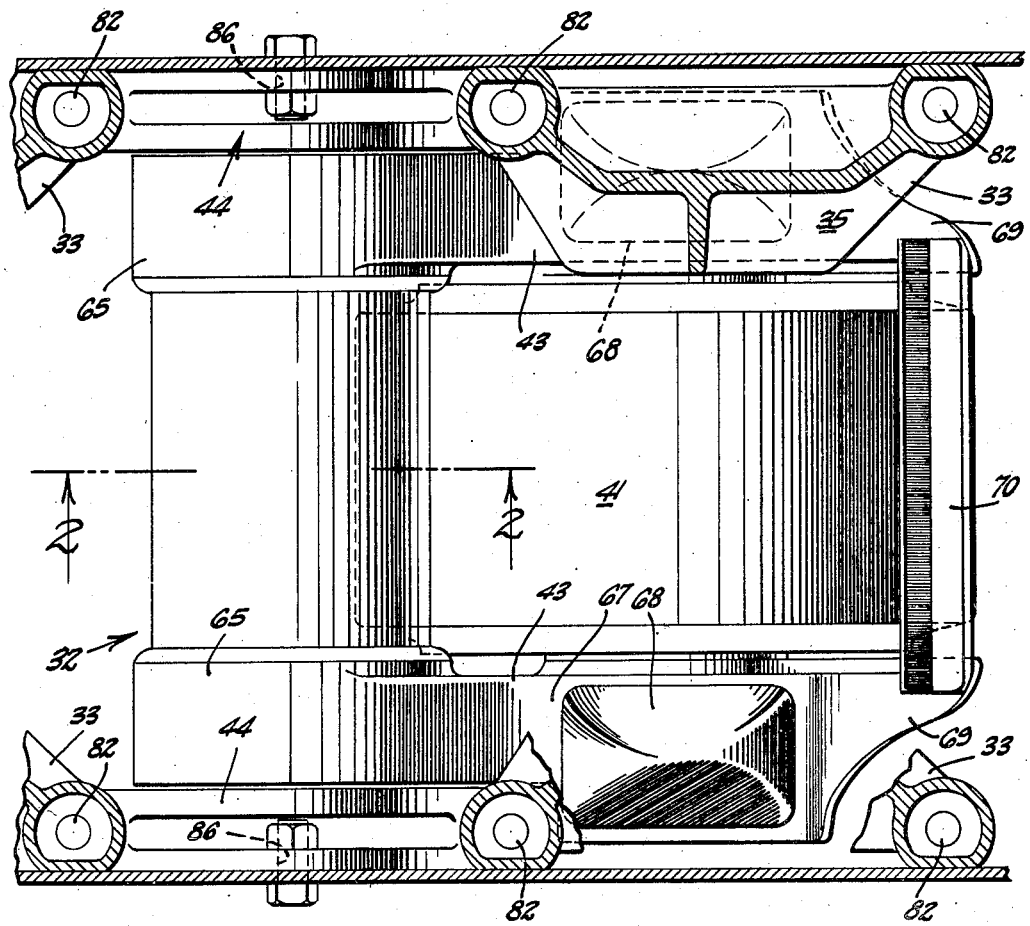

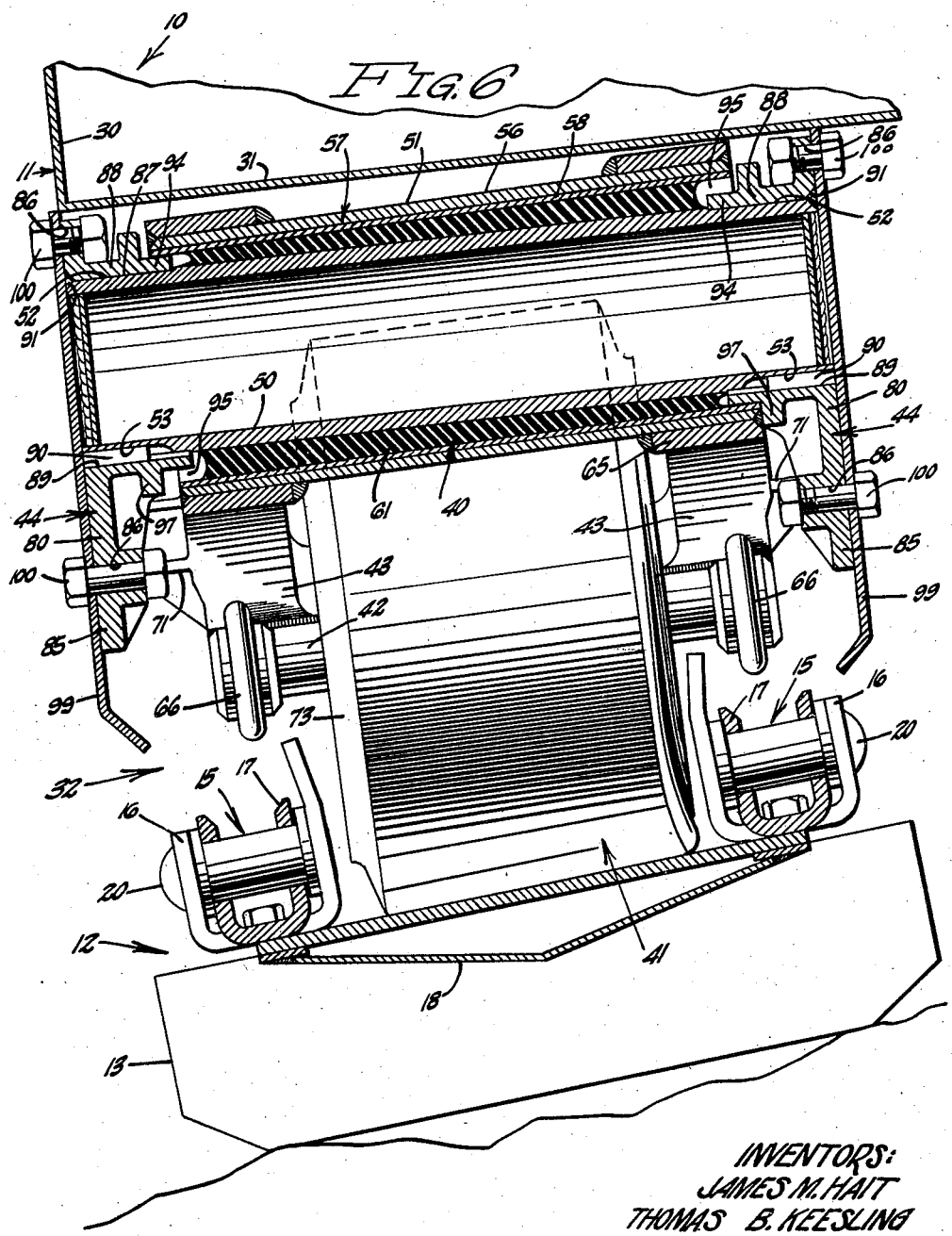

Patented July 2, 1946

2,403,362

UNITED STATES PATENT OFFICE 2,403,362

RUNNING GEAR

James M. Hait, San Gabriel, and Thomas B. Keesling, San Jose, Calif., assignors to Food Machinery Corporation, San Jose, Calif., a corporation of Delaware Application July 5, 1943, Serial No. 493,588

1 Claim. (Cl. 267—21)

This invention relates to a running gear for mounting wheels on vehicles and is particularly useful for mounting bogie wheels on track-laying vehicles.

It is an object of the invention to provide a novel cushioned wheel mounting in a running gear.

It is another object to provide such a mounting which will absorb tremendous shock loads without breakage or substantial wear and without requiring lubrication.

It is a further object of the invention to provide a rugged shock-absorbing running gear having a relatively light weight for the load it is adapted to carry.

A yet further object of the invention is to provide a running gear adapted for mounting bogie wheels on track-laying vehicles which employs a torsional elastic spring as a connection between such a wheel and vehicle thereby providing a very high torque load capacity in a relatively small space and yet prevent damage to the elastic material of the spring or undue displacement of the bogie wheel carried thereby due to excessive axial loads or unbalanced loads tending to cause cocking of the wheel.

The manner of accomplishing the foregoing objects as well as further objects and advantages, will be made manifest in the following description taken in connection with the accompanying drawings, in which:

Fig. 1 is a side elevational view of a portion of a track-laying amphibian in which is incorporated a preferred embodiment of the running gear of the invention.

Fig. 2 is a cross sectional view taken on the line 2—2 of Fig. 3.

Fig. 3 is a sectional view taken on the line 3—3 of Fig. 1, and showing the invention in plan.

Fig. 4 is a cross sectional view taken on the line 4—4 of Fig. 1 and illustrates the internal construction of the torsional elastic spring of the invention.

Fig. 5 is an enlarged fragmentary detail view illustrating the construction of said spring.

Fig. 6 is an operation view similar to Fig. 4, illustrating the manner in which the torsional elastic spring of the invention is protected and the cocking of the wheel limited in the operation of the invention.

Referring specifically to the drawings, these illustrate a portion of a track-laying amphibian 10 comprising a hull 11, having on each side thereof a track-laying mechanism (not shown in its entirety). Each of these mechanisms includes an endless track 12 carrying grousers 13, the latter resting on the ground and supporting the amphibian when the latter is travelling on land but being shaped to engage the water and provide propulsion for the amphibian when the latter is afloat.

While the endless track 12 may be of any suitable design provided for this purpose, it preferably consists of a pair of endless chains 15 made up of pairs of links 16 and 17, the links 16 having the grousers 13 bolted thereto and the links 17 having bridge plates 18 bolted or welded thereto.

The links 16 and 17 are connected together by pins 20, the links 16 overlapping the links 17 and having wheel guide ears 21 extending upwardly therefrom. The endless tracks 12 are so carried on the amphibian 10 that on each side of the amphibian the lower run of the track on that side lies beneath side portions of the hull 11 as shown in Figs. 1 and 4. This portion of the hull 11 has a side 30 and a bottom 31, the latter having affixed thereto a series of running gear units 32. These units are connected to the hull by base fittings 33 which are preferably welded to the hull bottom 31. Each of these base fittings includes a pair of bolt cages 34 which are connected by bumper stops 35.

Each unit 32 includes an annular elastic torque spring 40, a wheel 41 having an axle 42, a pair of arms 43 for connecting the axle 42 to the spring 40 and a pair of brackets 44 for mounting the spring 40 on the base fittings 33.

The torsional elastic spring 40 includes a pair of cylindrical members 50 and 51 concentrically disposed with the member 50 disposed within the member 51 and extending outwardly beyond opposite ends of the latter as clearly shown in Fig. 4. Portions 52 of the extending ends of the member 50 are slightly turned down, these portions preferably extending inwardly a short distance within the opposite ends of the member 51 as clearly shown in Fig. 5. The portions 52 likewise preferably have key seats 53 formed therein, the purpose of these to be made clear hereinafter.

The member 51 may be unitary or it may include an outer housing 56 and a sleeve 57 formed in two halves 58, each of which has a tangentially bent edge 59 which fits into correspondingly shaped recesses 60.

The space between the members 50 and 51 is occupied by an annular tubular body 61 of elastic material which is preferably rubber and which is bonded to adjacent surfaces of the members 50 and 51. This elastic tube 61 does not extend clear to the ends of the member 51 but terminates a short distance inwardly therefrom in concave surfaces forming an annular channel in the ends of the member 51. As clearly shown in Fig. 5, the surfaces of the members 50 and 51 adjacent the ends of the elastic tube 61 are coated with thin layers 62 of rubber which are applied to these surfaces and vulcanized in the same operation in which the tube 61 is secured and bonded to the members 50 and 51 in a rubber mold provided therefor.

The thin rubber layers 62 serve the important function of excluding the atmosphere and any water present from access to the border lines of the areas on either of the members 50 or 51 where these are bonded to the rubber spring tube 61. This has been found to assist materially in maintaining adhesion between members 50 and 51 and the tube 61 over long periods of service.

The arms 43 have eyes 65 into which the opposite ends of the member 51 are inserted and to which these ends are connected as by welding. The arms 43 are parallel and have clamps 66 near their ends for receiving and rigidly clamping opposite ends of the axle 42. End portions of the arms 43 provide faces 67 on which are fixed rubber bumpers 68 which serve to engage bumper stops 35 under extreme loads to prevent damage to the running gear unit 32.

The arms 43 have extensions 69 which are connected by a mud-scraping angle iron 70. This mud scraper is disposed close to the periphery of the wheel 41 for keeping mud from accumulating on said wheel. Each of the arms 43 is provided with a stop 71 which extends outwardly therefrom, the purpose of which will be made clear hereinafter.

The wheel 41 may be of any preferred construction, but preferably has a metal hub 72 containing a self-lubricating bearing rotatably relating the wheel to the axle 42 and preferably carries a tire 73 of solid rubber.

Each of the brackets 44 includes a body 80 having ears 81 which are adapted to be bolted by bolts 82 to the bolt cages 34 of an adjacent pair of fittings 33 so that the brackets 44 extend upwardly between these fittings. The body 80 has a downward extension 85 and has upper and lower bolt holes 86, the purposes of which will be made clear hereinafter.

The body 80 has a bore 87 and a sleeve 88 extending inwardly therefrom about said bore so as to fit one of the end portions 52 of the inner spring member 50. The bore 87 has a key way 89 which is adapted to match with the key way 53 of a corresponding end 52 of member 50 to accommodate a key 90. Besides the keys 90 preventing rotation between the member 50 and brackets 44, this member is preferably permanently united with these brackets as by welding material 91.

The sleeves 88 have annular flanges 94 which extend axially inwardly therefrom into the free spaces between the members 50 and 51 at opposite ends of the rubber spring tube 61. These flanges have such an outer diameter as to leave free spaces 95 between the flanges 94 and the member 51 which are preferably less than one-half of the thickness of the rubber tube 61.

Also provided on each sleeve 88 is an annular radial flange 97 which is spaced axially from the adjacent end member 51, the space 98 between this flange and the adjacent end of the member 51 being preferably less than the spaces 95.

Although not essential to the proper operation of the invention, provision is made for guarding the running gear units 32 by side plates 99 which are secured to the brackets 44 by bolts 100 passing through holes 86.

Operation

The running gear of the invention must not only provide a cushioned support for the amphibian 10, but it must be adapted to provide this support while the amphibian is operating over irregular ground. Normally the plane of the ground is substantially parallel with the bottom of the hull 11 in which case the invention operates as shown in Fig. 4.

Where the amphibian passes over ground sloping across the direction of its travel, the hull bottom 31 slopes laterally as illustrated in Fig. 6. This sets up an axial side thrust on the bogie wheels 41 which, of course, is transmitted to the springs 40. Where these side loads are excessive they tend to strip the rubber 61 from the tubular members 50 and 51. Such a load also tends to cock each of the bogie wheels affected, forcing the axle 42 out of parallelism with the inner member 50 of the connecting spring 40. This tends to cause this bogie wheel to crowd the bogie wheel guide ears 21 along the side of the track 12 towards which the wheel is thus cocked.

Another condition not infrequently met with is where one of the tracks 12 is unevenly supported as also shown in Fig. 6. This tends to cock the bogie wheels as they travel over the section of track thus supported.

It is to protect the springs 40 from damage by these abnormal loading conditions and also to prevent an excessive misalignment of the bogie wheels 41 with the tracks 12, that we provide the annular axial limit flanges 94 to limit the cocking movement of each bogie wheel and the radial limit flanges 97 to limit the endwise or axial shifting of the outer member 51 and the bogie wheel supported thereon.

An important advantage of the features described hereinabove is that elastic torque springs are thereby made available for use in heavy duty running gears in which a single wheel is called upon to support a maximum load of as much as 9000 pounds under unbalanced load conditions without damage being done to the spring and yet permitting said spring to function under normal operating conditions where the load on the wheels is more or less balanced without any frictional contact between the metallic parts of the spring.

The stops 71 provided on the arms 43 are positioned to engage the brackets 32 and thereby operate to prevent an accidental reverse rotation of the outer member 51 relative to the inner member 50. If such a reverse rotation were carried far enough it would tend to rotate the housing 56 relative to the split sleeve 57. This latter action is, of course, undesirable as it pulls the tangential locking edges 59 out of the recesses 60 and if permitted would tend to hold the member 51 in this abnormally rotated position relative to the member 50.

We claim:

In a running gear the combination of: an annular elastic torque spring including an inner cylindrical member, an outer sleeve member through which the inner member extends, and a tubular elastic element disposed in the space between and bonded to said members; means provided upon opposite ends of said inner member to mount said spring on a vehicle; a pair of arms rigidly fixed upon opposite ends of said sleeve member; an axle supported between said arms;

a wheel rotatably carried on said axle, an annular space being left free between said members at each end of said elastic element; a pair of annular axial flanges provided on said spring mounting means and extending into said annular spaces to form limit stops preventing pinching or undue stretching of said elastic element and also preventing excessive cocking of said wheel while permitting free resilient support of said vehicle by said spring without frictional metallic contact therein during ordinary operating conditions; and a pair of radial flanges provided on said spring mounting means and spaced from opposite ends of said sleeve member to limit end play of the latter under side thrust.

JAMES M. HAIT.
THOMAS B. KEESLING.